Patented Dec. 5, 1939

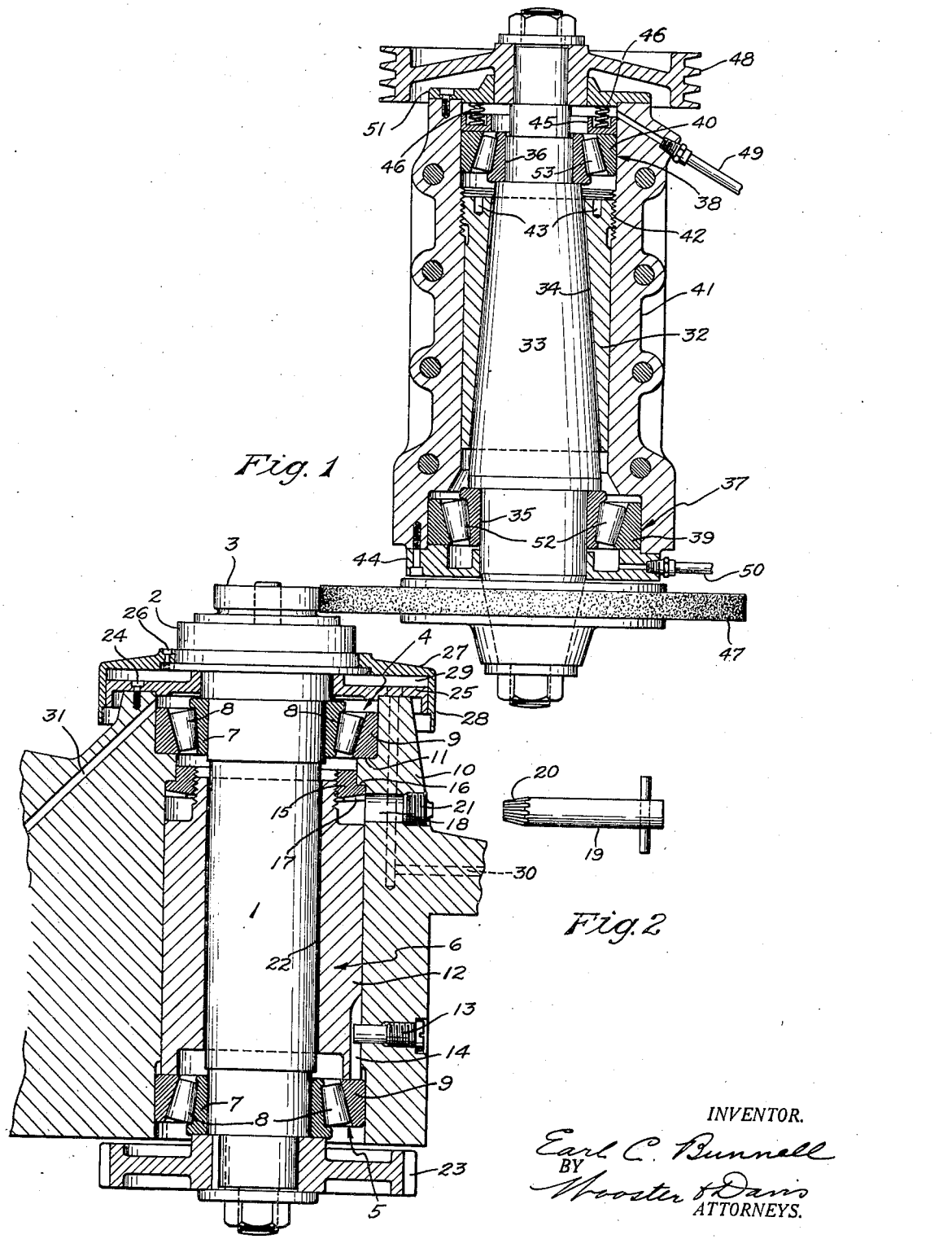

2,182,012

UNITED STATES PATENT OFFICE 2,182,012

SPINDLE

Earl C. Bunnell, Stratford, Conn., assignor to The Baird Machine Company, Bridgeport, Conn., a corporation of Connecticut Application January 7, 1937, Serial No. 119,425

6 Claims. (Cl. 308—35)

This invention relates to spindles and the means for mounting them, and more particularly to spindles for grinding machines either to carry circular work pieces to be ground or the grinding wheel.

Numerous attempts have been made to utilize the advantages of ball or roller bearings for the spindles of grinding machines to secure the advantages of such bearings, such as less friction, greater rigidity, the maintenance of a precise center of rotation, and so forth. But it has been found that with these bearings there is a very fine chatter effect with ball or roller bearings which shows up on the surface of the finished article so that this surface is neither smooth nor uniform. This is particularly objectionable where a very fine, smooth mirror-like finish is desired. In fact it prevents the securing of such a fine, smooth finish.

In a plain bearing there must always be sufficient clearance for a very thin film of oil in order to lubricate the bearing surfaces, and even with such a bearing it is difficult to do very fine accurate work as the variations in lateral pressure of the grinding wheel on the work squeezes out more or less of this oil film on the opposite side of the bearing permitting variations in the relative positions of the work and the grinding wheel as the spindle is shifted laterally from its normal or proper position, which prevents accurate work. This is called "sparking out".

It is therefore an object of this invention to overcome these objections in a simple and effective manner. I have found that by the use of both types of bearings for the same spindle these objectionable effects are eliminated, as the roller bearings rigidly retain the spindle in its proper lateral position in the plain bearing so that it is not pushed to one side and lateral play is prevented, and the plain bearing prevents the chatter effect which is produced where roller or ball bearings alone are used.

In the accompanying drawing

Fig. 1 shows a pair of spindles one for carrying the work to be ground and the other the grinding wheel to grind the surface of this work, the mountings and portions of the bearings being shown in section; and Fig. 2 is a side view of an adjusting tool. The construction and means of mounting each spindle shown may be used for either the work or the grinding wheel.

Throughout the specification and claims the term "roller bearing" is used in the generic sense as meaning either a ball bearing or a so-called roller bearing in which the rolling elements are either cylindrical or tapered rollers, as both the ball and roller bearings have a series of individual rolling elements running in raceways in the bearing.

In the drawing a spindle 1, in this case the work spindle, is shown provided with any suitable clutch or other means 2 for carrying a circular piece of work 3 to be ground. This spindle in the present case is mounted to rotate about a vertical axis, but of course could be differently arranged. This spindle is mounted in two longitudinally spaced roller bearings 4 and 5, and between these roller bearings is a plain bearing 6. The roller bearings may be of any suitable type but those shown comprise an inner ring 7 tight on the spindle having a suitable raceway for the tapered rollers 8 located between this ring and the outer supporting ring 9 mounted in the housing 10. The upper ring 9 is fitted in a counterbore in the housing and rests on a shoulder 11 and thus this upper bearing also forms a thrust bearing to support the spindle.

The plain bearing 6 comprises a sleeve 12 fitted and longitudinally slidable in the housing 10. It is held against rotary movement by any suitable means such as a screw stud 13 threaded into the housing and having its inner end projecting into a groove 14 in the side of the sleeve 12. For adjusting this sleeve has a reduced upper end on which is threaded a ring 15 having an annular shoulder 16 abutting a similar shoulder in the housing. It will be seen that by turning this ring the bearing sleeve 12 may be adjusted longitudinally of the spindle. For this purpose in the present case the ring is provided with a rack or gear teeth 17. In the side of the housing is an opening 18 in which a key or tool 19 may be inserted, this tool being provided at its inner end with gear teeth 20 to mesh with those of ring 15 to rotate it. The opening 18 may be closed by a suitable plug 21. It will be seen that as the lower end of sleeve 12 abuts the ring 9 of the lower roller bearing, by adjusting sleeve 12 the two roller bearings can be kept at the proper tightness.

As indicated the sleeve 12 forms a plain bearing for the spindle between the two roller bearings. There is a slight clearance between the sleeve and the spindle as indicated at 22 for an oil film, but this clearance is greatly exaggerated on the drawing, it being only sufficient to permit oil to enter the bearing to provide the necessary lubricating or oil film.

The spindle 1 may be rotated by any suitable means such as a gear 23 secured to its lower end and driven by any suitable driving gear, not shown.

Secured to the housing as by screws 24 about the spindle at its upper end is a ring 25, and above this and secured to the spindle as by screws 26 an inverted cap 27 having a depending flange 28 embracing the ring 25 and forming with it a seal 29 which may be kept packed with grease through a feed means and a suitable conduit 30.

The roller and plain bearings 4, 5 and 6 may be lubricated by oil fed through a conduit 31. Although the plain bearing 6 is shown as a cylindrical bearing it may be tapered such as is shown at 32 for the grinder spindle 33. The oil film for this bearing is shown at 34 although as in the case of the oil film 22 the clearance is greatly exaggerated on the drawing, the clearance being only sufficient to permit oil to enter the bearing to provide the necessary lubricating oil film. At the opposite end portions of the plain bearing 32 the spindle carries mounted tight thereon the rings 35 and 36 of the roller bearings 37 and 38 similar to the bearings 4 and 5 for spindle 1. The outer rings 39 and 40 of these bearings are mounted in the head or housing 41 of the machine. Between the rings are the rollers 52 and 53.

The sleeve 32 is mounted so as to be adjustable in the housing to maintain the proper clearance for the plain bearing. For this purpose it may have external threads at one end threaded into internal threads on the housing 41 as shown at 42 and by turning sleeve 32 it may thus be adjusted longitudinally of the housing and the spindle. It may be turned by any suitable means such as a spanner wrench seated in recesses 43.

It will be seen the lower bearing ring 39 is supported on the head 44 and therefore this lower bearing 37 supports the spindle and forms a thrust bearing. On the upper ring 40 is a slidable ring or follower 45 with springs 46 between it and cap 51 secured to the housing 41 and pressing the follower against the ring 40. Therefore these springs allow the spindle to expand and contract with changes of temperature and keeps the bearings tight. The spindle at its lower end carries the abrasive grinding wheel 47 and is driven by any suitable means such as a pulley 48 by one or more belts from any suitable source of power (not shown).

The bearings may be lubricated by circulating oil through them. Thus the oil may be fed in through the conduit 49 and after passing through the bearings may flow out the conduit 50. The plain bearing 32, 33 for this grinding wheel spindle instead of being tapered may be straight or cylindrical the same as bearing 6 for the spindle 1 if preferred.

As above suggested the combination of the roller and plain bearings eliminates the chatter effect secured with roller bearings alone, and also eliminates the inaccuracy of the plate bearing alone. It gives the advantages of the roller bearing such as rigidity and maintenance of a precise center of rotation. However, the combination of the two types of bearings cures these defects and gives a fine mirror-like finish with an accurate uniform surface on the work ground.

Having thus set forth the nature of my invention, what I claim is:

1. In combination, a rotary spindle, a roller bearing for said spindle, a plain bearing for the spindle adjacent the roller bearing, both bearings being arranged to simultaneously support the spindle and form running bearings therefor during normal operation of the spindle, said spindle and bearing having similarly tapered bearing surfaces provided a tapered plain bearing for the spindle, and means for relatively adjusting said plain bearing and spindle longitudinally of the spindle to adjust the thickness of the oil film between the tapered surfaces.

2. In combination, a rotary spindle, a pair of longitudinally spaced roller bearings for the spindle, a tapered plain bearing for the spindle located between the roller bearings and movable longitudinally of the spindle, and means for shifting said plain bearing longitudinally of the spindle to adjust the thickness of the oil film in the bearing.

3. In combination, a rotary spindle, a housing, a pair of longitudinally spaced roller bearings for the spindle, a plain bearing for the spindle located between the roller bearings, said spindle and plain bearing having cooperating tapered bearing surfaces, said plain and roller bearings being adapted to simultaneously form supporting and running bearings for the spindle during normal operation thereof, said plain bearing being rigidly mounted and fixed in the housing against against lateral movement during normal operation of the spindle and movable longitudinally of the spindle, and means for shifting said plain bearing longitudinally of the spindle to adjust the thickness of the oil film in the bearing.

4. In a grinder, a rotary spindle, means on the spindle for carrying a circular member, a pair of longitudinally spaced roller bearings for the spindle, a plain bearing for the spindle located between the roller bearings, said spindle and plain bearing having cooperating tapered bearing surfaces, said bearings being arranged to simultaneously form supporting and running bearings for the spindle during normal operation thereof, means for shifting said plain bearing and said spindle relative to each other longitudinally of the axis of the spindle to adjust the thickness of the oil film between the tapered surfaces, and means for rotating the spindle.

5. In a grinder, a rotary spindle, a grinding wheel carried by the spindle, a pair of longitudinally spaced roller bearings for the spindle, a plain bearing for the spindle located between the roller bearings, said spindle and plain bearing having cooperating tapered bearing surfaces, said bearings being arranged to simultaneously form supporting and running bearings for the spindle during normal operation thereof, means for relatively shifting the plain bearing and spindle to adjust the thickness of the oil film between the tapered surfaces, and means for rotating the spindle.

6. In a grinder, a rotary spindle, a grinding wheel mounted on the spindle, a housing, a roller bearing for the spindle in the housing, a plain bearing for the spindle adjacent the roller bearing, said spindle and plain bearing having cooperating tapered bearing surfaces, said bearings being arranged to simultaneously form supporting and running bearings for the spindle during normal operation thereof, said plain bearing being mounted in the housing for shifting movement longitudinally of the spindle, means for shifting said bearing to adjust the thickness of the oil film between the tapered surfaces, and means for driving the spindle.

EARL C. BUNNELL.